US008463838B1

(12) United States Patent
Ulhorn

(10) Patent No.: US 8,463,838 B1
(45) Date of Patent: Jun. 11, 2013

(54) OPTICAL PROCESSOR INCLUDING WINDOWED OPTICAL CALCULATIONS ARCHITECTURE

(75) Inventor: Brian L Ulhorn, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 896 days.

(21) Appl. No.: 12/607,469

(22) Filed: Oct. 28, 2009

(51) Int. Cl.
*G06F 15/00* (2006.01)

(52) U.S. Cl.
USPC ........... 708/816; 708/319; 708/520; 708/623; 708/835

(58) Field of Classification Search
USPC .......................... 708/319, 520, 623, 816, 835
See application file for complete search history.

(56) References Cited

U.S. PATENT DOCUMENTS

| | | | | |
|---|---|---|---|---|
| 6,230,175 | B1 * | 5/2001 | Okamoto et al. | 708/319 |
| 7,296,048 | B2 * | 11/2007 | Ohmi et al. | 708/520 |
| 8,019,805 | B1 * | 9/2011 | Sarma | 708/627 |
| 8,140,607 | B2 * | 3/2012 | Carlough et al. | 708/623 |
| 2007/0011222 | A1 * | 1/2007 | Dance et al. | 708/603 |
| 2010/0250635 | A1 * | 9/2010 | Osada | 708/205 |

OTHER PUBLICATIONS

Optical addition architecture.
Optical multiply architecture.
Optical multiply and add architecture.
U.S. Appl. No. 12/481,223, filed Jun. 9, 2009.
U.S. Appl. No. 12/607,448, filed Oct. 28, 2009.
U.S. Appl. No. 12/571,723, filed Oct. 1, 2009.

* cited by examiner

*Primary Examiner* — Tammara Peyton
(74) *Attorney, Agent, or Firm* — Hamre, Schumann, Mueller & Larson, P.C.

(57) ABSTRACT

A windowed optical calculation architecture and process that efficiently performs high speed multi-element multiply and accumulates on a digital data stream. A data point from a digital data stream is impressed onto an optical source to create an optical value. The optical value is split into a number of branches equaling the number of elements used in the calculation. In each branch, the optical value is modulated to reflect the coefficients in the calculation. Then, depending upon the branch, the optical value is delayed depending on its position in the calculation, with optical values at the beginning of the calculation being delayed longer than optical values at the end of the calculation. The outputs from the branches are coupled together to perform an optical sum, and passed to detection/analog-digital conversion circuitry to convert the optical result to a digital result.

9 Claims, 9 Drawing Sheets

OPTICAL PROCESSOR INCLUDING WINDOWED OPTICAL CALCULATIONS ARCHITECTURE

FIELD

This disclosure relates to photonics and optical computing.

BACKGROUND

The use of photonic architectures to perform a variety of arithmetic functions is known. For example, FIG. 1 illustrates a conventional photonic architecture that is configured to perform the addition of two digital signals A, B to form a result R. FIG. 2 illustrates a conventional photonic architecture that is configured to multiply two digital signals A, B together to form a result R. FIG. 3 illustrates a conventional photonic architecture that is configured to perform the arithmetic function $a_1 \cdot b_1 + a_2 \cdot b_2 + \ldots + a_n \cdot b_n = R$ composed of a plurality of multiply and accumulates.

Multiply and accumulate type calculations are often done on data streams, such as in signal or image processing algorithms, in an electrical digital signal processor (DSP). When the calculation is done in an electrical DSP, the data points must be shifted through memory or the pointers to the values shifted and the result constantly recalculated.

SUMMARY

A windowed optical calculation architecture and process are described that efficiently performs high speed multi-element multiply and accumulates on a digital data stream. The digital data stream can be any type of digital data stream on which multi-element multiply and accumulates need to be performed. Examples of digital data streams include, but are not limited to, signal and image processing data streams.

In the process, a value from a digital data stream is impressed onto an optical source to create an optical value. The optical value is split into a number of branches. The number of branches equals the number of elements used in the calculation (which can also be referred to as the size of the kernel in a list convolution). In each branch, the optical value is modulated to reflect the coefficients in the calculation. Then, depending upon the branch, the optical value is delayed depending on its position in the calculation, with optical values at the beginning of the calculation being delayed longer than optical values at the end of the calculation. The outputs from the branches are coupled together to perform an optical sum, and passed to detection/analog-digital conversion circuitry to convert the optical result to a digital result.

An example of an optical architecture suitable for performing the process includes a data converter that receives digital data point signals from the digital data stream converts the digital data point signals into analog optical signals. A plurality of coefficient converters receive digital coefficient signals and convert the digital coefficient signals into analog electric signals. An optical splitter is connected to the data converter to receive the analog optical signals and split each received optical signal into a plurality of branches. Multipliers are connected to the optical splitter and to the coefficient converters to receive the branches and the analog electric signals, and multiply each branch by a respective one of the analog electric signals to create a plurality of partial optical products. A delay circuit is connected to each of the multipliers except for a last one of the multipliers to receive the partial optical product from the respective multiplier to which it is connected. Each delay circuit delays propagation of the partial optical product from the respective multiplier. An optical coupler is connected to the last one of the multipliers and each delay circuit, and an optical to digital converter is connected to the optical converter.

DRAWINGS

DETAILED DESCRIPTION

Figure 4:
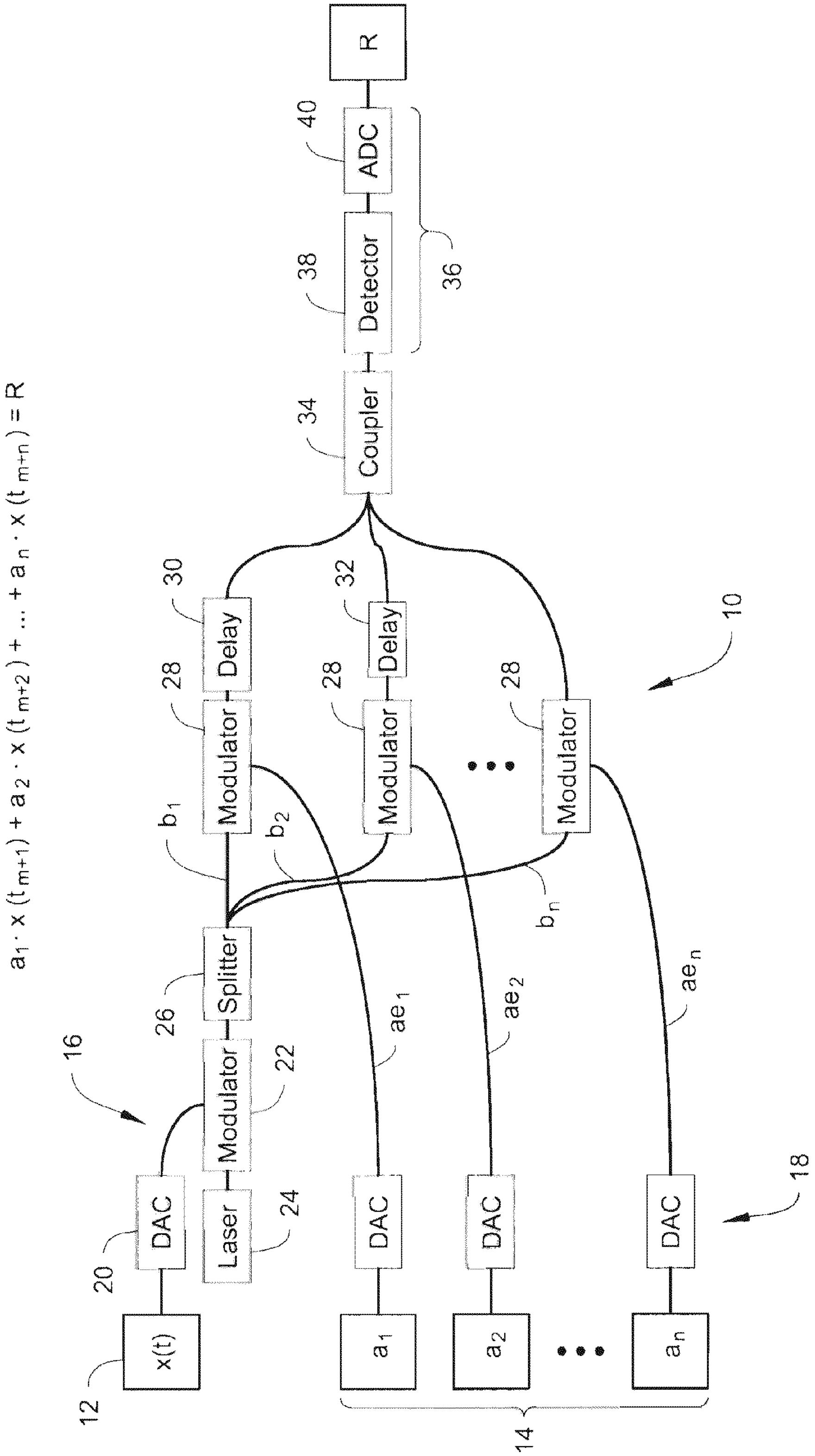
FIG. 4 illustrates an example of a windowed optical calculation architecture.

An example of a windowed optical calculation architecture 10 is illustrated in FIG. 4 that is configured to perform high speed multi-element multiply and accumulates on data from a digital data stream. In particular, the architecture 10 is configured to perform the arithmetic function $a_1 \cdot x(t_{m+1}) + a_2 \cdot x(t_{m+2}) + \ldots + a_n \cdot x(t_{m+n}) = R$. Examples of digital data streams that the architecture 10 can be employed with include, but are not limited to, signal and image processing data streams in applications such as, for example, noise reduction, edge detection on an object, and the like.

In FIG. 4, digital data 12 is input to the architecture 10. The data 12 is a series of single data points (x), one data point (x) presented in each clock cycle. The data 12 can come from a suitable data source including, but not limited to, memory, a tape storage device, and/or a sensor.

Also input into the architecture are digital coefficients $a_1$, $a_2$, . . . $a_n$ 14 for the arithmetic function. The number of coefficients equals the number of data points x or elements in the arithmetic function (similar to the size of the kernel in a list convolution). The coefficients can be generated by coefficient generators that use techniques known to those having ordinary skill in the art, for example averaging or Gaussian techniques. The coefficients are usually determined beforehand, either from theoretical calculation or from empirically tuning the coefficients on a fixed data set to obtain the desired result.

An example of theoretically determining the coefficients is an averaging function used in noise reduction. In this example, assume there are four elements to be averaged: $(x_1+x_2+x_3+x_4)/4$. This may be rewritten to $(1/4)x_1+(1/4)x_2+(1/4)x_3+(1/4)x_4$, from which the four coefficients are all $(1/4)$. In using this example on a fixed test set, further adjustments to the coefficients may yield better results leading to empirically adjusting the coefficients to, for example, $(1/4)$, $(1/3)$, $(1/4)$, and $(1/6)$.

The data point signals x are input into a data converter 16 that converts the digital data point signals into analog optical signals, while the digital coefficients are input into coefficient converters 18 that convert the digital coefficient signals into analog electric signals.

The data converter 16 can be any device(s) suitable for converting the digital data points into analog optical signals. As shown in FIG. 4, the converter 16 comprises a digital to analog converter (DAC) 20 which receives the data points and converts them to analog electric signals, together with an optical modulator 22 that impresses an optical output from a laser 24 with the analog electrical signal from the DAC 20 and outputs an analog optical signal therefrom.

The coefficient converters 18 for the coefficients 14 can be any devices suitable for converting the digital coefficients into analog electric signals. As shown in FIG. 4, the converters 18 comprise digital to analog converters (DACs) 20 which receive the coefficients and convert them to analog electric signals $ae_1$, $ae_2$ . . . $ae_n$.

The output analog optical signal from the modulator 22 is fed into an optical splitter 26 which splits the analog optical signal into a plurality of branches $b_1$, $b_2$ . . . $b_n$. The number of branches is equal to the number of coefficients 14. Each branch is fed into a multiplier which in the illustrated embodiment is an optical modulator 28. In addition, the analog electric signals $ae_1$, $ae_2$ . . . $ae_n$ are fed into the modulators 28, with the signal $ae_1$ being fed to the modulator receiving branch $b_1$, the signal $ae_2$ being fed to the modulator receiving branch $b_2$, and the signal ac being fed to the modulator receiving brunch $b_n$.

Figure 1:
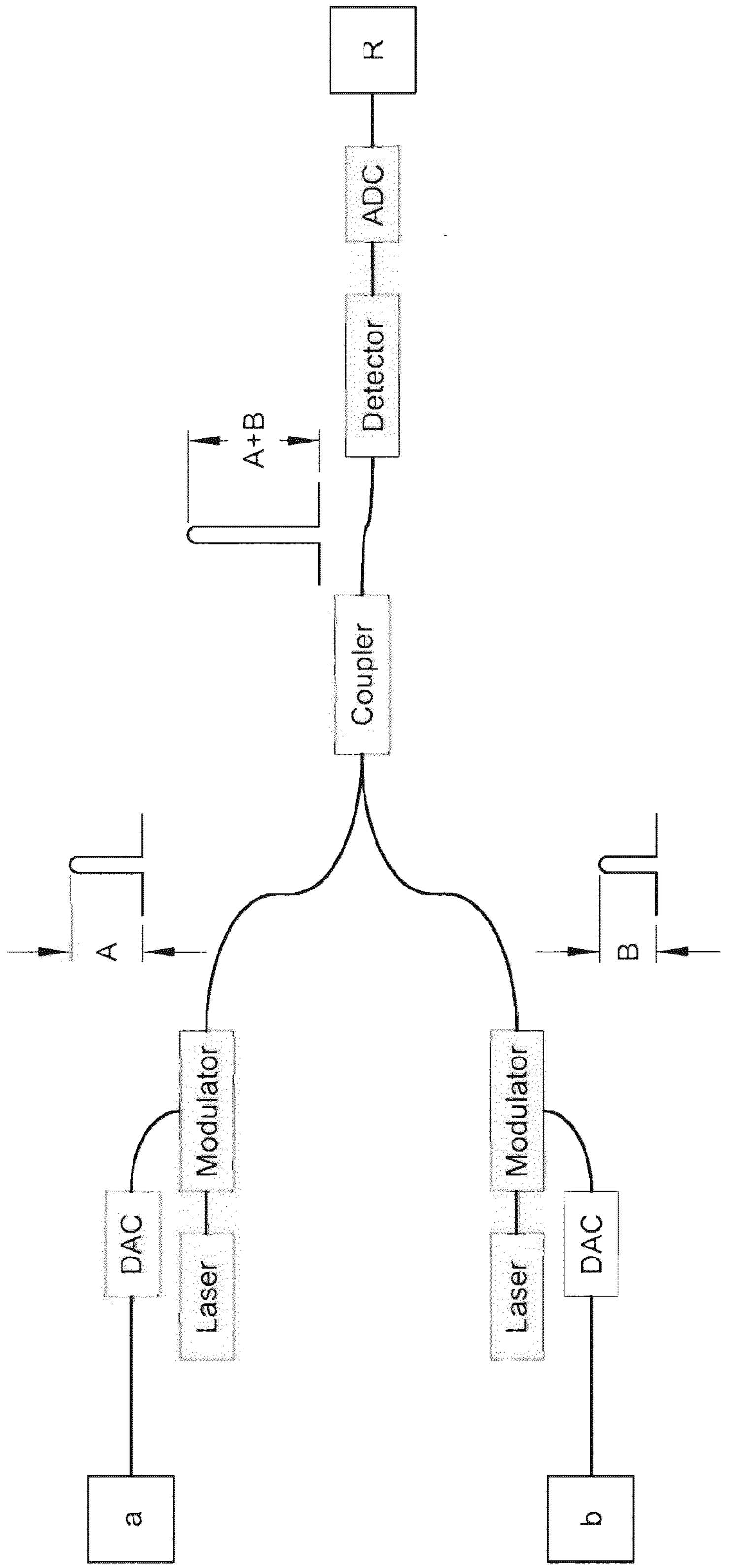
Fig. 1 Prior Art
FIG. 1 illustrates a conventional photonic architecture that is configured to perform the addition of two digital signals.
Figure 2:
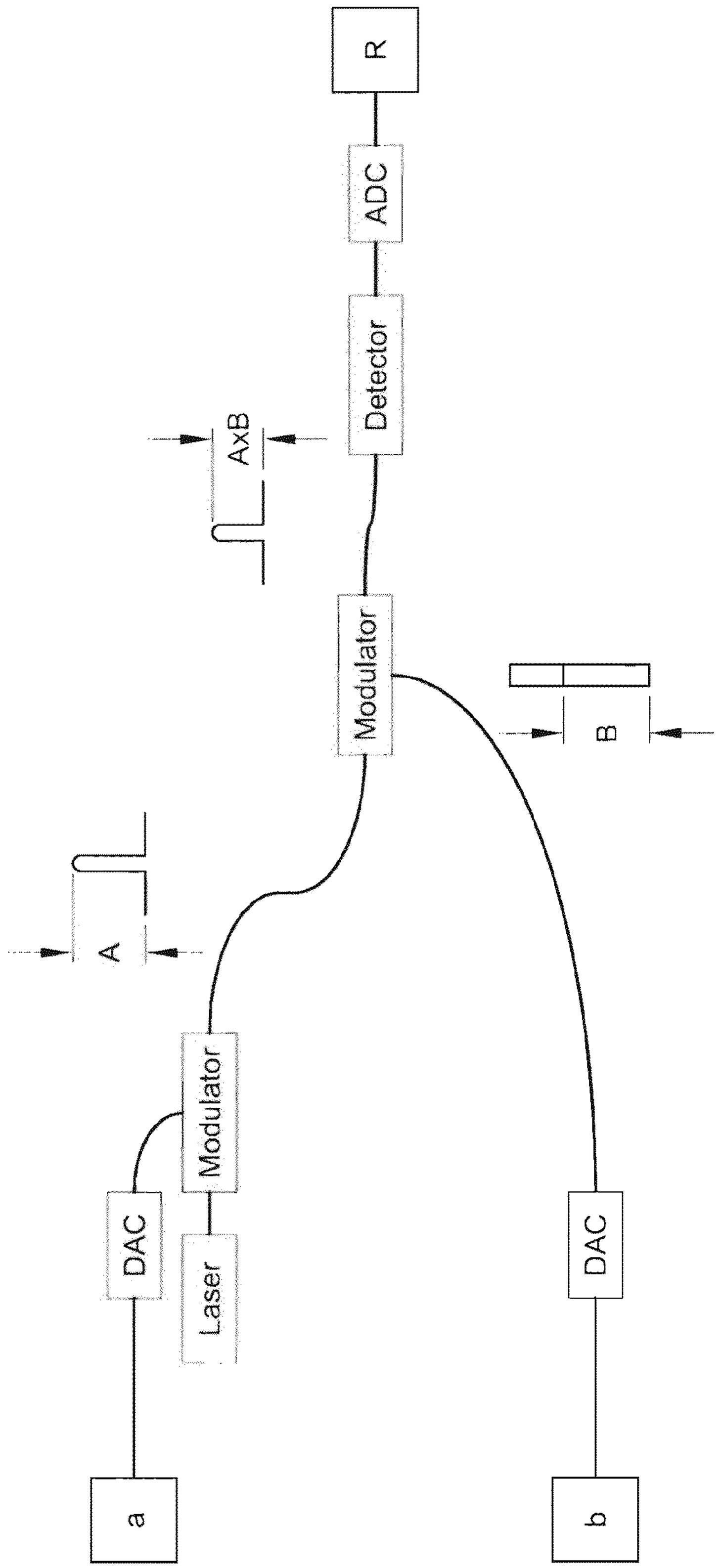
Fig. 2 Prior Art
FIG. 2 illustrates a conventional photonic architecture that is configured to multiply two digital signals.
Figure 3:
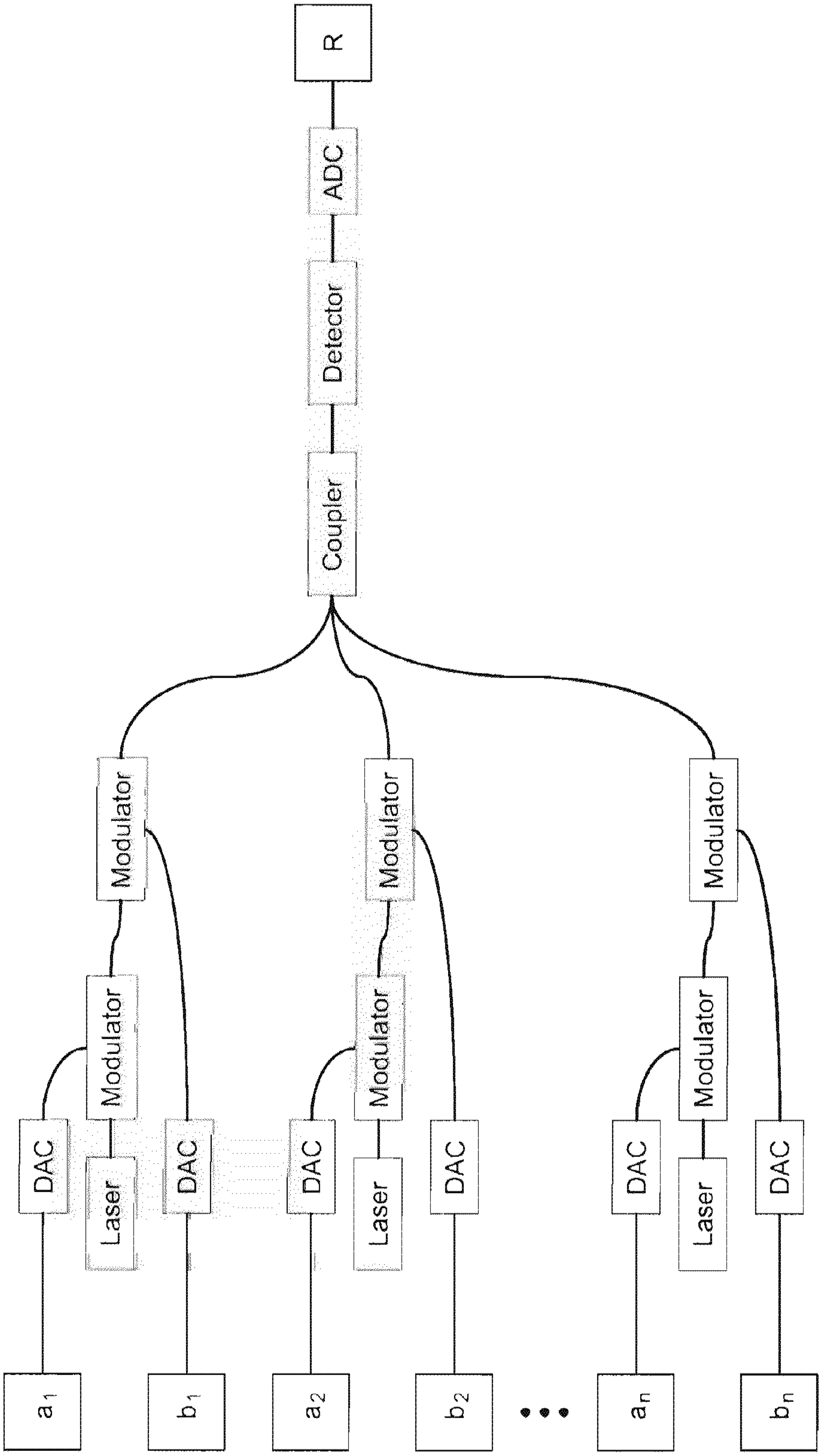
Fig. 3 Prior Art
FIG. 3 illustrates a conventional photonic architecture that is configured to perform a plurality of multiply and accumulates.

The optical modulators 28 multiply the analog optical signals of branches $b_1$, $b_2$ . . . $b_n$ with the analog electric signals $ae_1$, $ae_2$ . . . $ae_n$ to create a plurality of partial optical products. How an optical modulator performs multiplication of an analog optical signal and an analog electric signal to create an optical product is known from the photonic architecture of FIG. 2.

Depending upon their position in the arithmetic function, all of the partial optical products except for the last partial optical product are fed into delay circuits 30, 32. The delay circuits 30, 32 are designed to delay propagation of their respective partial optical products for a suitable time period measured in clock cycles. The delay circuits 30, 32 can be any device(s) suitable for delaying propagation of optical signals including, but not limited to, loops of optical fiber.

The amount of delay is based on the number of optical modulators 28 and the position of each modulator 28 in the architecture. In the example illustrated in FIG. 4, the delay circuit 30 is configured to introduce 2 clock cycles of delay into the propagation of the optical product $b_1 \times ae_1$, the delay circuit 32 is configured to introduce 1 clock cycle of delay into the propagation of the optical product $b_2 \times ae_2$. There is no delay associated with the last modulator 28 producing the partial optical product $b_n \times ae_n$.

The optical outputs from the delay circuits 30, 32 and the last modulator 28 are fed to an optical coupler 34 that accumulates (i.e. adds or sums) the optical outputs to produce an optical result. The optical result is then fed into an optical-to-digital converter 36 that is configured to convert the optical result into a digital result. Any device that is capable of converting the optical result into a digital result can be used. For example, as illustrated, the converter 36 includes a detector 38 which converts the optical result signal into an analog electric result signal, and an analog-to-digital converter (ADC) 40 which converts the analog electric result signal into the digital result signal R.

Figure 5:
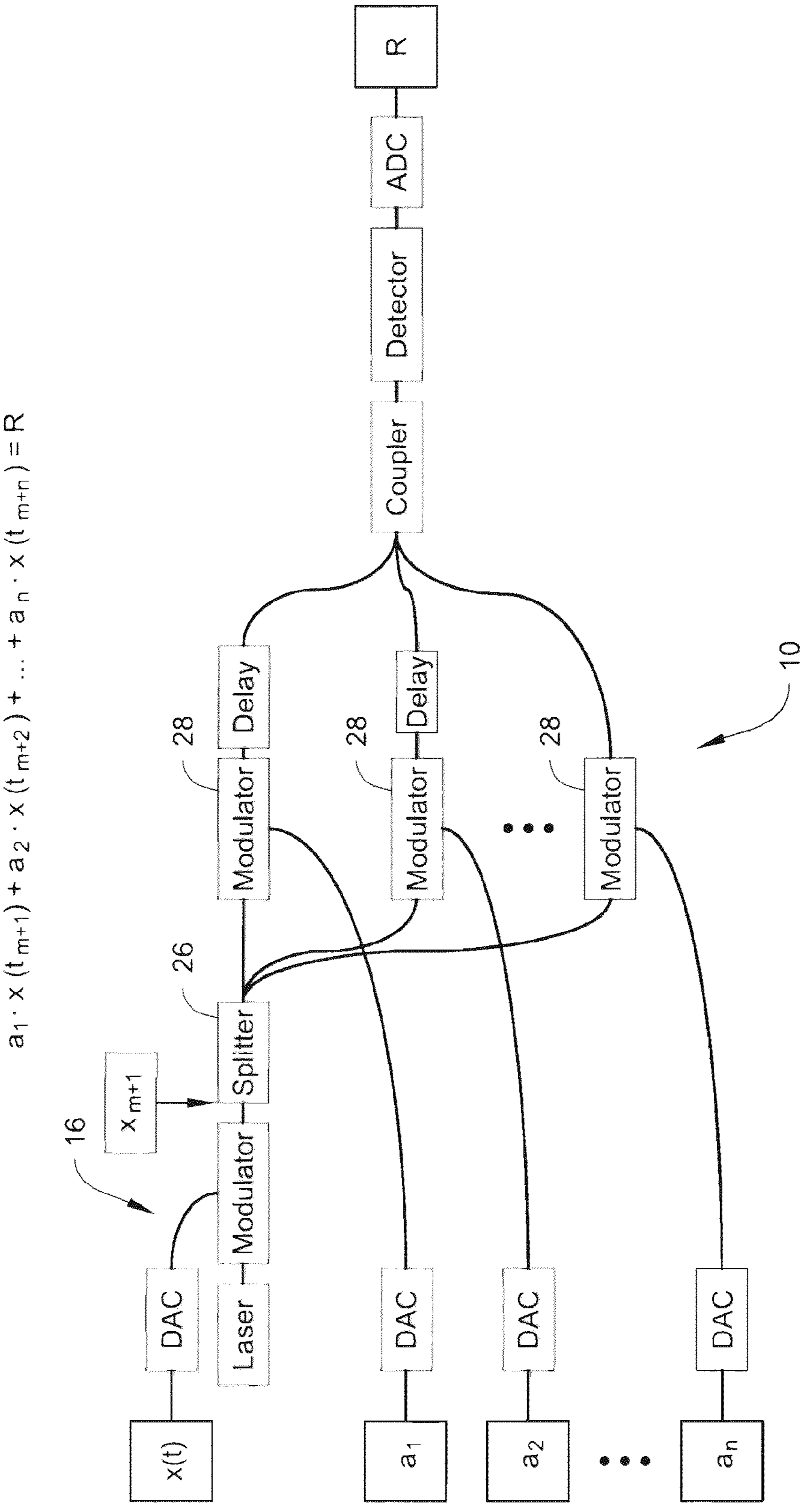
FIGS. 5-9 illustrate the flow of data through the architecture of FIG. 4 to perform the illustrated arithmetic function.
Figure 6:
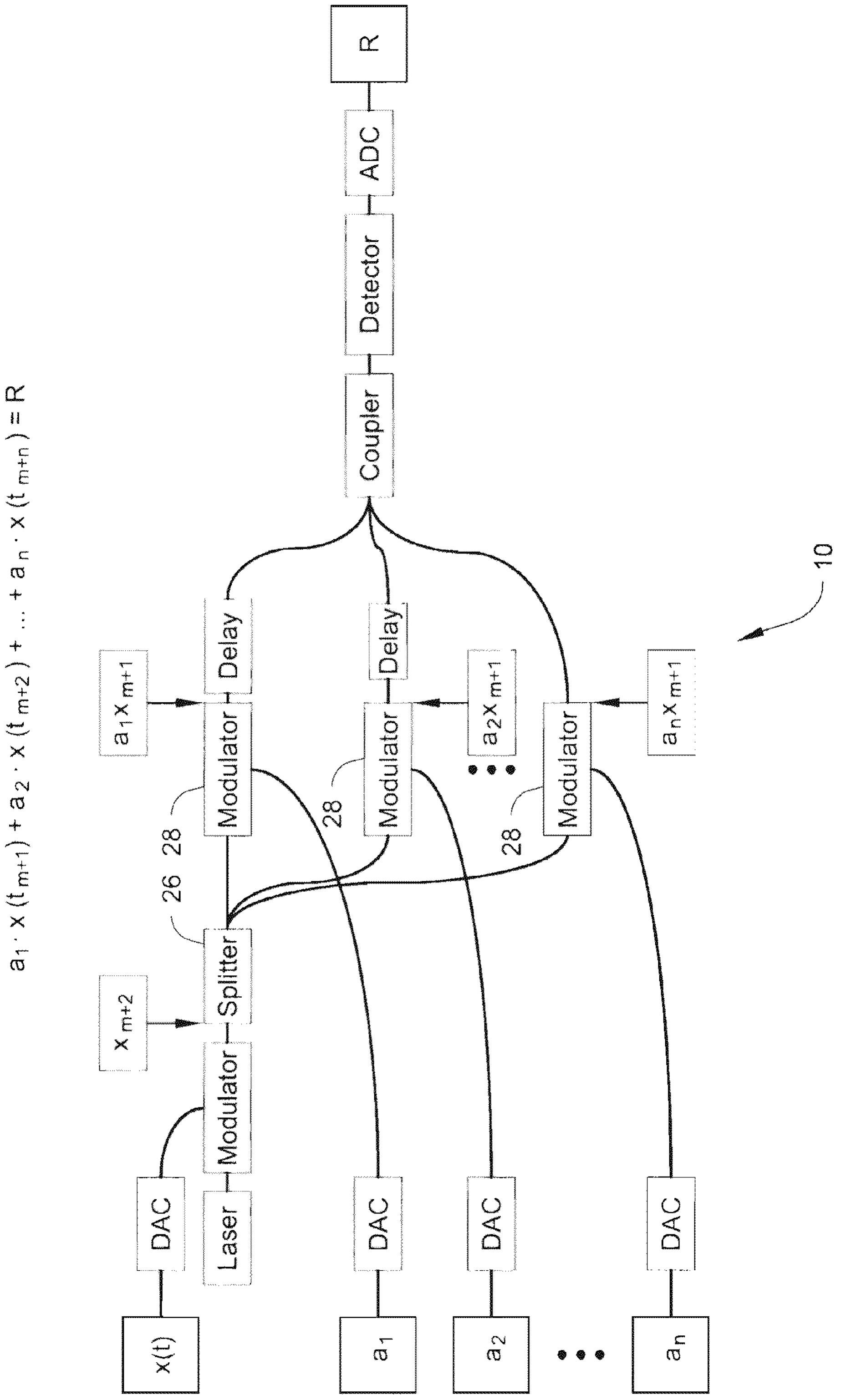

FIGS. 5-9 illustrate the operation of the architecture 10, FIG. 5 shows a first data point $x_{m+1}$ that has been input in a clock cycle and, and after being converted to an optical signal, is shown entering the optical splitter 26. In FIG. 6, in another clock cycle, the data point $x_{m+1}$ has been split by the splitter 26 into the branches and fed into the modulators 28 where the data point $x_{m+1}$ has been multiplied by the coefficients $a_1$, $a_2$, . . . $a_n$ to produce partial optical products $a_1x_{m+1}$, $a_2x_{m+1}$ and $a_nx_{m+1}$. At the same time, another data point, $x_{m+2}$, has been input and is shown entering the splitter.

Figure 7:
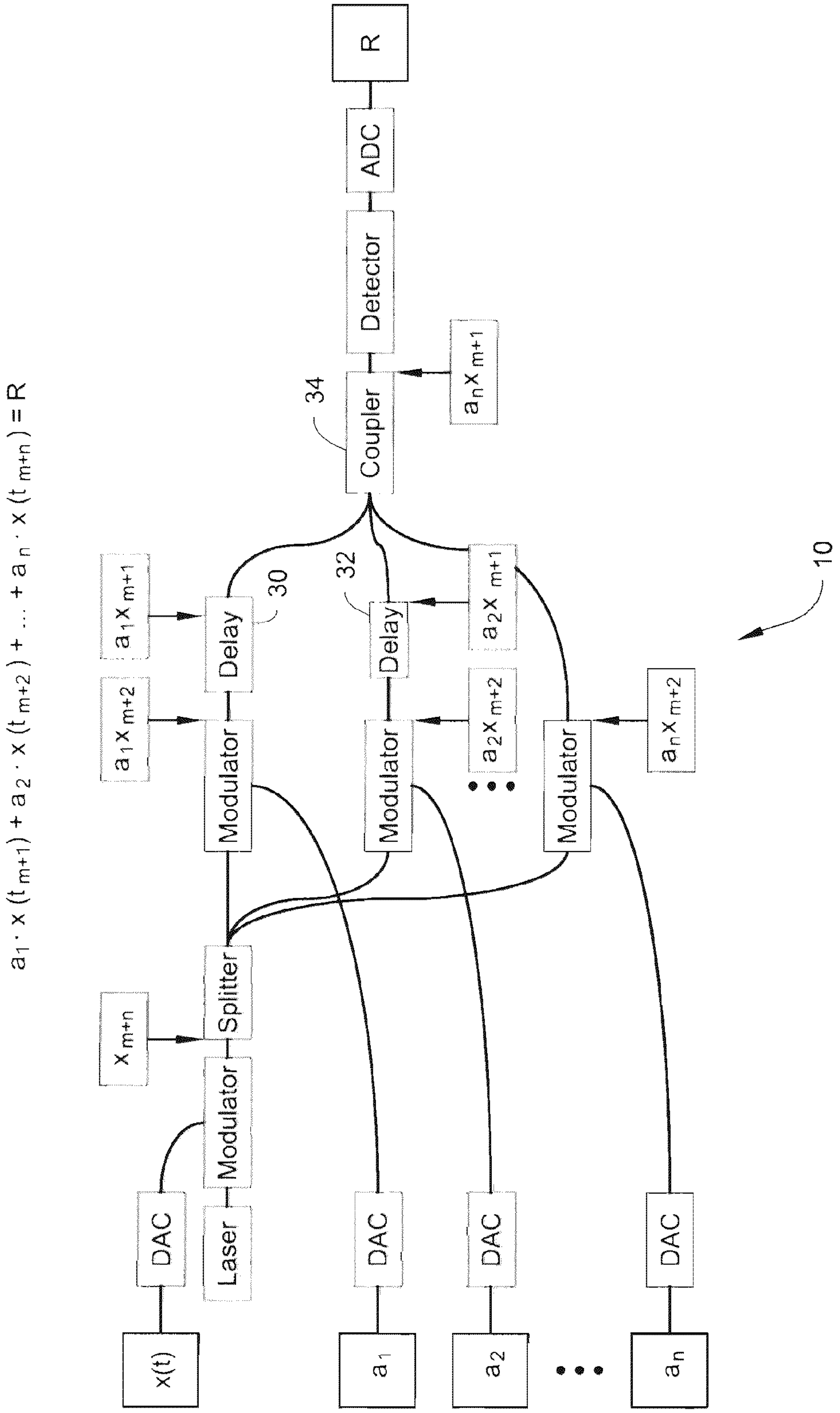

With reference to FIG. 7, in another clock cycle, the partial optical products $a_1x_{m+1}$ and $a_2x_{m+1}$ have entered the delay circuits 30, 32. Because the delay of the circuit 30 is longer than the delay of the circuit 32, the product $a_1x_{m+1}$ is still delayed in the delay circuit while the product $a_2x_{m+1}$ has progressed through the delay of the circuit 32 and is shown as exiting the circuit 32. At the same time, the partial optical product $a_nx_{m+1}$ has reached and progressed through the coupler 34. In the illustrated example, since there are three products in the arithmetic circuitry, the processing or application layer of the implementation is programmed such that the first two products are to be ignored. In this case, the partial optical product $a_nx_{m+1}$ is simply ignored. At the same time, another data point, $x_{m+n}$, has been input, and partial optical products $a_1x_{m+2}$, $a_2x_{m+2}$ and $a_nx_{m+2}$ have been produced from the data point $x_{m+2}$.

Figure 8:
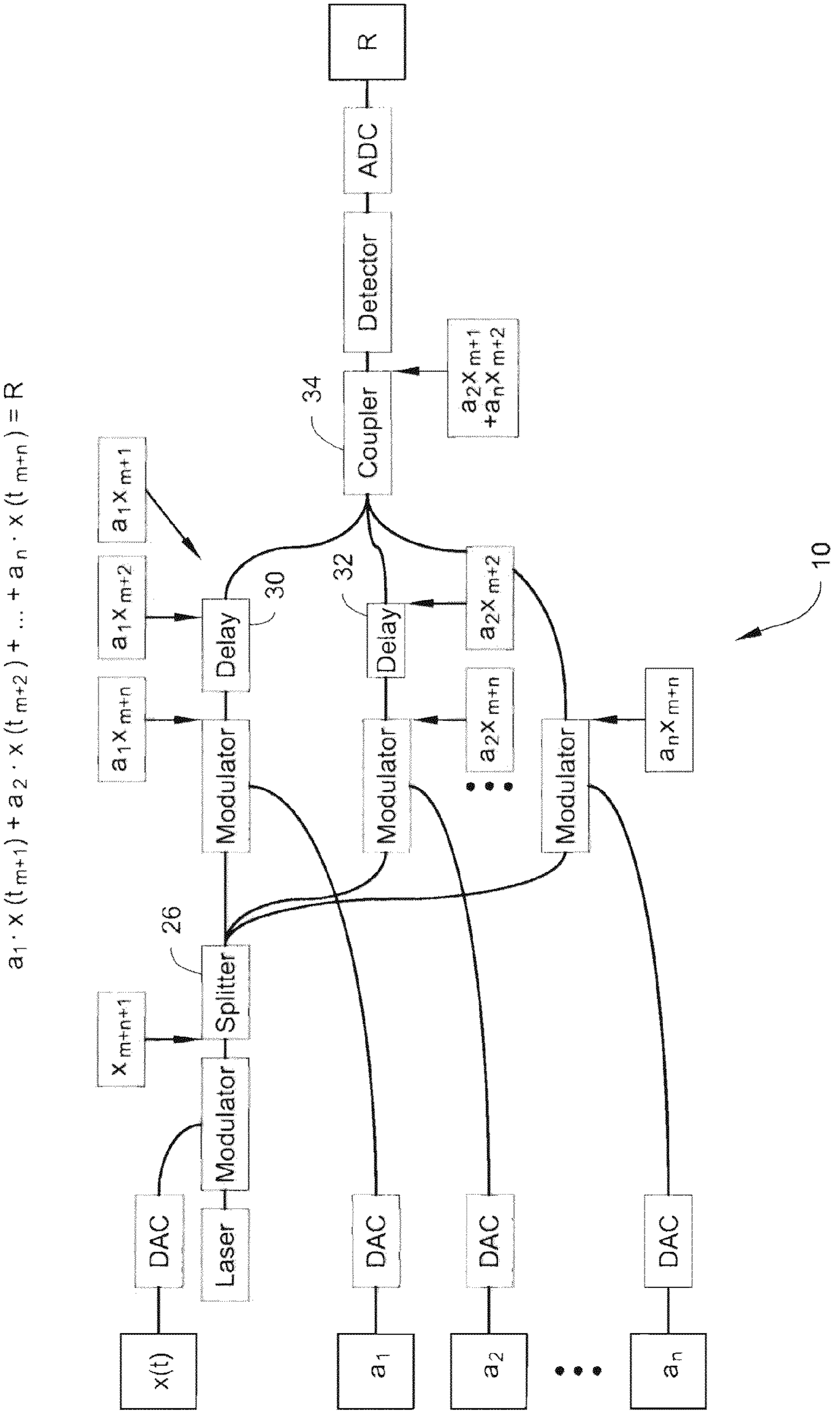

In another clock cycle as shown in FIG. 8, partial optical product $a_1x_{m+1}$ has exited the delay circuit 30, product $a_1x_{m+2}$ has entered the delay circuit 30, and partial optical product has been created. Further, partial optical product $a_2x_{m+1}$ from the delay circuit 32 and partial optical product $a_nx_{m+2}$ from the last modulator have reached the coupler 34 and are ignored. At the same time, partial optical product $a_2x_{m+2}$ has entered and progressed through the delay circuit 32, partial optical products $a_2x_{m+n}$ and $a_nx_{m+n}$ have been created and another data point, $x_{m+n+1}$, has been input.

Figure 9:
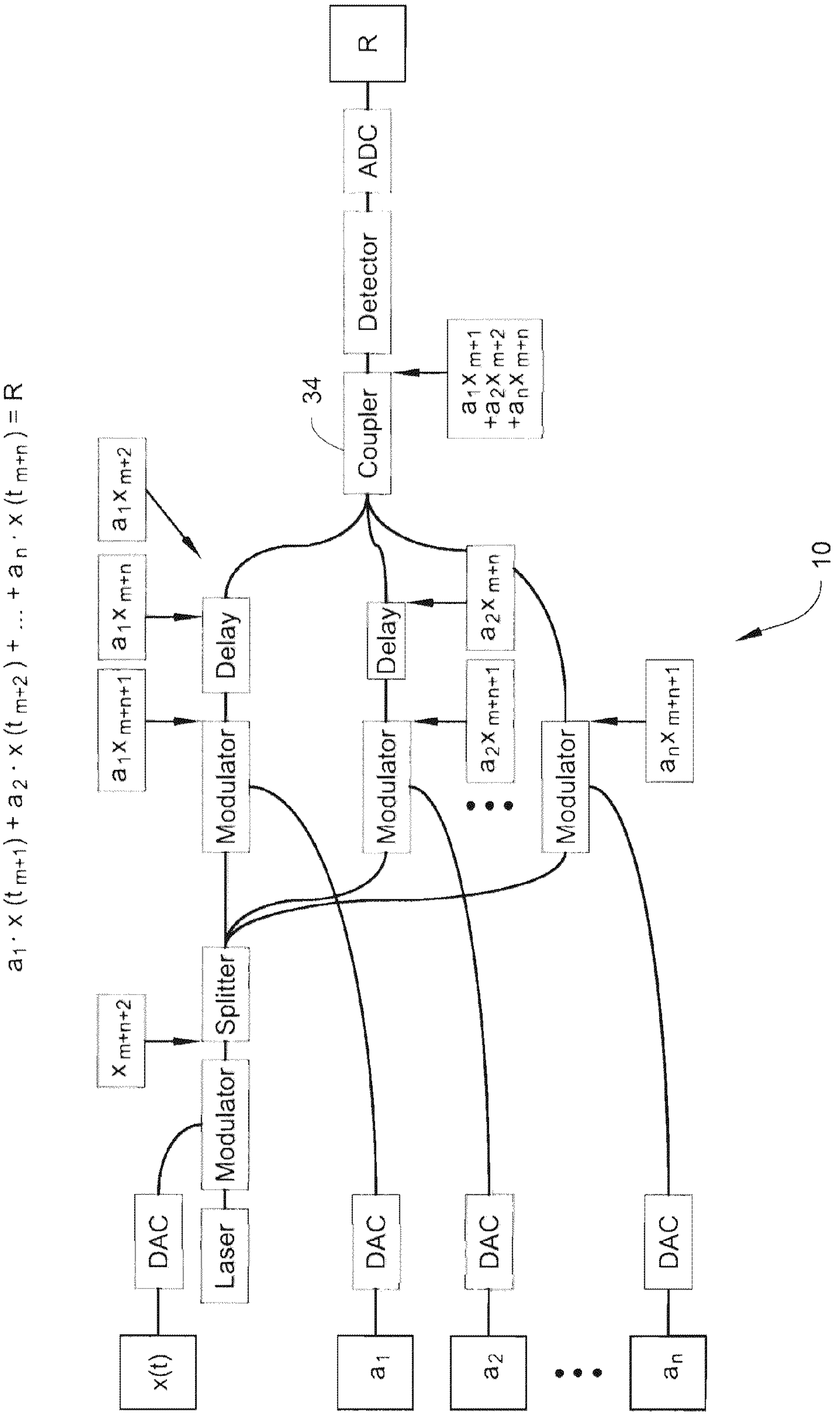

Finally, in the next clock cycle shown in FIG. 9, partial products $a_1x_{m+1}$, $a_2x_{m+2}$ and $a_nx_{m+n}$ which form the partial products of the arithmetic function performed by the architecture 10, have reached the coupler 34. These partial products are accumulated (i.e. summed) by the coupler 34 to form the optical result which is then converted into the digital result R. The remaining partial products and newly entered data point can either be ignored or used as part of a new arithmetic function.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An optical calculation architecture that performs an arithmetic function on data from a digital data stream, comprising:

a data converter configured to receive digital data point signals from the digital data stream and configured to convert the digital data point signals into analog optical signals;

a plurality of coefficient converters configured to receive digital coefficient signals for the arithmetic function and configured to convert the digital coefficient signals into analog electric signals;

an optical splitter connected to the data converter to receive the analog optical signals and split each received optical signal into a plurality of branches;

multipliers connected to the optical splitter and to the coefficient converters to receive the branches and the analog electric signals, the multipliers being configured to multiply each branch by a respective one of the analog electric signals to create a plurality of partial optical products;

a delay circuit connected to each of the multipliers except for the last one of the multipliers and configured to receive the partial optical product from the respective multiplier to which it is connected, each delay circuit configured to delay propagation of the partial optical product from the respective multiplier;

an optical coupler connected to the last one of the multipliers and each delay circuit; and an optical to digital converter connected to the optical converter.

2. The optical calculation architecture of claim 1, wherein the data converter and the coefficient converters each comprise a digital to analog converter.

3. The optical calculation architecture of claim 2, wherein the data converter also includes an optical modulator connected to the digital to analog converter and a laser connected to the modulator.

4. The optical calculation architecture of claim 1, wherein the multipliers comprise optical modulators.

5. The optical calculation architecture of claim 1, wherein each delay circuit comprises a loop of optical fiber.

6. The optical calculation architecture of claim 1, comprising a plurality of delay circuits, and the delays provided by the delay circuits differ from one another.

7. An optical calculation process, comprising:

dividing a digital data stream into a plurality of digital data point signals;

inputting the digital data point signals into a data converter and converting each digital data point signal into an analog optical signal using the data converter;

inputting the analog optical signals into an optical splitter and splitting each of the analog optical signals into a plurality of branches using the optical splitter;

inputting a plurality of digital coefficient signals into coefficient converters and converting the plurality of digital coefficient signals into analog electric signals using the coefficient converters;

inputting each branch and a respective one of the analog electric signals into optical modulators and multiplying each branch by the respective one of the analog electric signals to create a plurality of partial optical products using the optical modulators;

inputting each of the partial optical products except for a last partial optical product into delay circuits and introducing propagation delays into each of the partial optical products except for the last partial optical product using the delay circuits;

inputting outputs of the delay circuits and the last partial optical product into an optical coupler and optically summing the outputs of the delay circuits and the last partial optical product to create an optical product using the optical coupler; and inputting the optical product into an optical to digital converter and converting the optical product to a digital result using the optical to digital converter.

8. The optical calculation process of claim 7, wherein converting each digital data point signal into an analog optical signal using the data converter comprises using an optical modulator to impress an optical output from a laser with an analog electrical signal.

9. The optical calculation process of claim 7, wherein introducing propagation delays into each of the partial optical products except for a last partial optical product using the delay circuits comprises introducing a first propagation delay into a first one of the partial optical products using a first one of the delay circuits and a second propagation delay into a second one of the partial optical products using a second one of the delay circuits, where the first propagation delay is greater than the second propagation delay.

* * * * *

UNITED STATES PATENT AND TRADEMARK OFFICE

CERTIFICATE OF CORRECTION

PATENT NO. : 8,463,838 B1
APPLICATION NO. : 12/607469
DATED : June 11, 2013
INVENTOR(S) : Uhlhorn It is certified that error appears in the above-identified patent and that said Letters Patent is hereby corrected as shown below:

Title Page, Item (12), should read --Uhlhorn--.

Title Page, Item (75), after “Inventor:” delete “Brian L Ulhorn” and insert --Brian L Uhlhorn--.

Signed and Sealed this
Thirteenth Day of August, 2013

Teresa Stanek Rea
*Acting Director of the United States Patent and Trademark Office*